United States Patent
Bienfang et al.

(10) Patent No.: US 9,190,852 B2
(45) Date of Patent: Nov. 17, 2015

(54) SYSTEMS AND METHODS FOR STABILIZING POWER RATE OF CHANGE WITHIN GENERATOR BASED APPLICATIONS

(71) Applicant: Caterpillar Global Mining LLC, Oak Creek, WI (US)

(72) Inventors: David T. Bienfang, Racine, WI (US); Robert A. Hamann, Oak Creek, WI (US); Michael G. Onsager, Franklin, WI (US); Michael E. Brandt, Racine, WI (US); Marcelo C. Algrain, Dunlap, IL (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 659 days.

(21) Appl. No.: 13/624,600

(22) Filed: Sep. 21, 2012

(65) Prior Publication Data

US 2014/0084685 A1 Mar. 27, 2014

(51) Int. Cl.
  *H02J 1/10* (2006.01)
  *H02J 3/00* (2006.01)
  *H02J 3/14* (2006.01)
  *H02M 1/10* (2006.01)
  *H02J 7/00* (2006.01)
  *H02J 9/00* (2006.01)
  *H02J 7/14* (2006.01)
  *H02J 3/32* (2006.01)
  *H02J 7/34* (2006.01)

(52) U.S. Cl.
  CPC ... *H02J 7/00* (2013.01); *H02J 3/32* (2013.01); *H02J 7/1446* (2013.01); *H02J 9/00* (2013.01); *H02J 7/345* (2013.01); *Y10T 307/344* (2015.04)

(58) Field of Classification Search
  CPC ...... H02J 7/00; H02J 7/1446; Y10T 307/305; Y10T 307/406; Y10T 307/344
  USPC ............................................... 307/18, 29, 31
  See application file for complete search history.

(56) References Cited

U.S. PATENT DOCUMENTS

| 3,425,574 A | 2/1969 | Wilgrubs et al. |
| 3,891,354 A | 6/1975 | Bosch |
| 4,050,478 A | 9/1977 | Virtue et al. |

(Continued)

FOREIGN PATENT DOCUMENTS

| DE | 22 51 904 | 4/1974 |
| DE | 23 31 617 | 1/1975 |

(Continued)

OTHER PUBLICATIONS

International Search Report and Written Opinion for International Application No. PCT/EP2007/003582, mail date Jan. 30, 2008, 23 pages.

(Continued)

*Primary Examiner* — Carlos Amaya
(74) *Attorney, Agent, or Firm* — Foley & Lardner LLP (57) ABSTRACT

Systems and methods for monitoring an electrical energy storage unit and a parameter related to the load and based on the monitoring, if the load parameter is greater than a second rate of change of electrical power for a second component of an electrical power system, providing power from the electrical energy storage unit to the second component until the load parameter and the second component have equivalent rates of change of electrical power.

20 Claims, 8 Drawing Sheets

(56) References Cited

U.S. PATENT DOCUMENTS

| | | | |
|---|---|---|---|
| 4,230,022 | A | 10/1980 | Bianchetta et al. |
| 4,533,900 | A | 8/1985 | Muhlberger et al. |
| 4,606,313 | A | 8/1986 | Izumi et al. |
| 4,763,473 | A | 8/1988 | Ziplies et al. |
| 4,875,337 | A | 10/1989 | Sugiyama et al. |
| 5,167,121 | A | 12/1992 | Sepehri et al. |
| 5,295,353 | A | 3/1994 | Ikari |
| 5,303,551 | A | 4/1994 | Lee |
| 5,563,351 | A | 10/1996 | Miller |
| 5,673,558 | A | 10/1997 | Sugiyama et al. |
| 5,722,190 | A | 3/1998 | Arnold |
| 5,852,934 | A | 12/1998 | Chung et al. |
| 5,890,303 | A | 4/1999 | Ishikawa et al. |
| 6,005,360 | A | 12/1999 | Pace |
| 6,087,945 | A | 7/2000 | Yasuda |
| 6,141,629 | A | 10/2000 | Yamamoto et al. |
| 6,148,548 | A | 11/2000 | Tohji |
| 6,164,069 | A | 12/2000 | Takahashi et al. |
| 6,164,388 | A | 12/2000 | Martunovich et al. |
| 6,175,217 | B1 | 1/2001 | Da Ponte et al. |
| 6,199,307 | B1 | 3/2001 | Kagoshima et al. |
| 6,282,891 | B1 | 9/2001 | Rockwood |
| 6,323,608 | B1 | 11/2001 | Ozawa |
| 6,326,763 | B1 | 12/2001 | King et al. |
| 6,339,737 | B1 | 1/2002 | Yoshimura et al. |
| 6,422,001 | B1 | 7/2002 | Sherman et al. |
| 6,460,332 | B1 | 10/2002 | Maruta et al. |
| 6,584,769 | B1 | 7/2003 | Bruun |
| 6,591,697 | B2 | 7/2003 | Henyan |
| 6,591,758 | B2 | 7/2003 | Kumar |
| 6,612,246 | B2 | 9/2003 | Kumar |
| 6,635,973 | B1 | 10/2003 | Kagoshima et al. |
| 6,650,091 | B1 | 11/2003 | Shiue et al. |
| 6,678,972 | B2 | 1/2004 | Naruse et al. |
| 6,683,389 | B2 | 1/2004 | Geis |
| 6,708,787 | B2 | 3/2004 | Naruse et al. |
| 6,725,581 | B2 | 4/2004 | Naruse et al. |
| 6,789,335 | B1 | 9/2004 | Kinugawa et al. |
| 6,799,424 | B2 | 10/2004 | Ioku et al. |
| 6,810,362 | B2 | 10/2004 | Adachi et al. |
| 6,820,356 | B2 | 11/2004 | Naruse et al. |
| 6,832,175 | B2 | 12/2004 | Adachi et al. |
| 6,864,663 | B2 | 3/2005 | Komiyama et al. |
| 6,870,139 | B2 | 3/2005 | Petrenko |
| 6,876,098 | B1 | 4/2005 | Gray, Jr. |
| 6,907,384 | B2 | 6/2005 | Adachi et al. |
| 6,922,990 | B2 | 8/2005 | Naruse et al. |
| 6,962,050 | B2 | 11/2005 | Hiraki et al. |
| 7,069,674 | B2 | 7/2006 | Arii |
| 7,078,825 | B2 | 7/2006 | Ebrahim et al. |
| 7,078,877 | B2 | 7/2006 | Salasoo et al. |
| 7,082,758 | B2 | 8/2006 | Kageyama et al. |
| 7,096,985 | B2 | 8/2006 | Charaudeau et al. |
| 7,146,808 | B2 | 12/2006 | Devier et al. |
| 7,174,826 | B2 | 2/2007 | Kerrigan et al. |
| 7,190,133 | B2 | 3/2007 | King et al. |
| 7,251,934 | B2 | 8/2007 | Lech et al. |
| 7,252,165 | B1 | 8/2007 | Gruenwald et al. |
| 7,258,183 | B2 | 8/2007 | Leonardi et al. |
| 7,275,369 | B2 | 10/2007 | Kim |
| 7,298,102 | B2 | 11/2007 | Sopko et al. |
| 7,356,991 | B2 | 4/2008 | Kim et al. |
| 7,378,808 | B2 | 5/2008 | Kuras et al. |
| 7,386,978 | B2 | 6/2008 | Ivantysynova et al. |
| 7,398,012 | B2 | 7/2008 | Koellner |
| 7,401,464 | B2 | 7/2008 | Yoshino |
| 7,430,967 | B2 | 10/2008 | Kumar |
| 7,439,631 | B2 | 10/2008 | Endou |
| 7,444,809 | B2 | 11/2008 | Smith et al. |
| 7,444,944 | B2 | 11/2008 | Kumar et al. |
| 7,448,328 | B2 | 11/2008 | Kumar |
| 7,456,509 | B2 | 11/2008 | Gray, Jr. |
| 7,479,757 | B2 | 1/2009 | Ahmad |
| 7,518,254 | B2 | 4/2009 | Donnelly et al. |
| 7,531,916 | B2 | 5/2009 | Franklin et al. |
| 7,532,960 | B2 | 5/2009 | Kumar |
| 7,533,527 | B2 | 5/2009 | Naruse |
| 7,560,904 | B2 | 7/2009 | Alvarez-Troncoso |
| 7,571,683 | B2 | 8/2009 | Kumar |
| 7,596,893 | B2 | 10/2009 | Tozawa et al. |
| 7,628,236 | B1 | 12/2009 | Brown |
| 7,730,981 | B2 | 6/2010 | McCabe et al. |
| 7,748,279 | B2 | 7/2010 | Budde et al. |
| 8,022,663 | B2 | 9/2011 | Davis et al. |
| 8,147,255 | B2 | 4/2012 | Wu |
| 8,626,403 | B2 | 1/2014 | Onsager et al. |
| 2002/0104239 | A1 | 8/2002 | Naruse et al. |
| 2003/0089557 | A1 | 5/2003 | Eilinger |
| 2004/0021441 | A1 | 2/2004 | Komiyama et al. |
| 2004/0073468 | A1 | 4/2004 | Vyas et al. |
| 2005/0012337 | A1* | 1/2005 | Yoshimatsu ............ 290/40 C |
| 2005/0061561 | A1 | 3/2005 | Leonardi et al. |
| 2005/0139399 | A1 | 6/2005 | Gopal |
| 2005/0246082 | A1 | 11/2005 | Miki et al. |
| 2005/0263331 | A1 | 12/2005 | Sopko et al. |
| 2006/0061922 | A1 | 3/2006 | Mihai et al. |
| 2006/0125421 | A1 | 6/2006 | Costa |
| 2007/0080236 | A1 | 4/2007 | Betz et al. |
| 2007/0166168 | A1 | 7/2007 | Vigholm et al. |
| 2007/0234718 | A1 | 10/2007 | Vigholm |
| 2008/0157592 | A1 | 7/2008 | Bax et al. |
| 2008/0290842 | A1 | 11/2008 | Davis et al. |
| 2008/0295504 | A1 | 12/2008 | Vigholm et al. |
| 2009/0056324 | A1 | 3/2009 | Itakura et al. |
| 2009/0090102 | A1 | 4/2009 | Busse et al. |
| 2009/0159143 | A1 | 6/2009 | Nishikawa et al. |
| 2010/0097029 | A1 | 4/2010 | McCabe |
| 2010/0156180 | A1 | 6/2010 | Nishiyama |
| 2010/0289443 | A1 | 11/2010 | Mazumdar et al. |
| 2011/0254513 | A1 | 10/2011 | Kagoshima |
| 2012/0086220 | A1 | 4/2012 | Abdel-Baqi et al. |

FOREIGN PATENT DOCUMENTS

| | | |
|---|---|---|
| DE | 36 11 553 | 7/1987 |
| DE | 41 02 621 | 8/1992 |
| DE | 699 20 452 | 11/2005 |
| DE | 102005 0 17 127 | 11/2006 |
| JP | 2000-170687 | 6/2000 |
| JP | 2003-013866 | 1/2003 |
| JP | 2004-100847 | 4/2004 |
| JP | 2008-057687 | 3/2008 |
| JP | 2008199844 | 8/2008 |
| JP | 2009-167618 | 7/2009 |
| JP | 4928613 | 2/2012 |
| KR | 10199641737 | 12/1996 |
| KR | 10300305 | 6/2001 |
| WO | WO-90/10850 | 9/1990 |
| WO | WO-2004/074686 | 9/2004 |
| WO | WO-2010/058768 | 5/2010 |

OTHER PUBLICATIONS

International Search Report and Written Opinion for International Application No. PCT/US2010/048257, mail date May 27, 2011, 7 pages.

International Search Report and Written Opinion for International Application No. PCT/US2011/052966, mail date Apr. 10, 2012, 9 pages.

International Search Report and Written Opinion for International Application No. PCT/US2011/057491, mail date May 18, 2012, 9 pages.

International Search Report and Written Opinion for International Application No. PCT/US2011/052950, mail date Apr. 16, 2012, 7 pages.

* cited by examiner

SYSTEMS AND METHODS FOR STABILIZING POWER RATE OF CHANGE WITHIN GENERATOR BASED APPLICATIONS

TECHNICAL FIELD

The present disclosure relates generally to electrical power systems, and particularly to systems for stabilizing electrical power rate of change within generator based applications.

BACKGROUND

Many applications depend on electricity supplied by an electrical power distribution network, such as the electrical power grid operated by an electrical power utility company. Commercial and industrial applications may draw significant electrical power, such as machinery, generator applications, etc. Loads may be dynamic and the power rate of change between the electrical power machinery and the generator power source may be imbalanced. The effect of the imbalance between the power rates of change may lead to transients within the system. Transients may lead to temporary outages in the electrical power distribution network. The cumulative effect of transients may lead to degradation and failure of applications, such as reducing the life of an engine, a generator, etc. The power rate of change imbalance may also lead to an increase in the fuel consumption rate of the electrical machinery, because the machinery has to consume more fuel to account for the transients within the system.

One application that draws significant electrical power is mining. In a mining operation, the electrical power distribution network feeds a variety of loads, ranging from small industrial motors to large draglines. Electrical mining excavators, such as electric shovels and draglines, present a cyclic load to the electrical power distribution network. In some instances, the electrical powered machinery, such as the electrical mining excavator, may operate using a generator as a power source, with a greater rate of power demand than what the generator can supply.

A conventional system matches the peak load of the components within the system. For example, an upper limit is set for the electrical power drawn from the electrical power source. When the input electrical power drawn by the machinery exceeds the upper limit, then the electrical power is supplied by an electrical energy storage unit. An exemplary method is disclosed in U.S. Pat. No. 8,147,225 that was issued on May 8, 2012.

To improve performance, reliability, economic feasibility, etc. of an electrical power system, it is important to analyze the power demand, compare the power demand between components, and then match the power demands of the components within the system. In some implementations, additional generators have been added to the system until the rate of power was stabilized throughout the system. However, cost and other factors may limit the ability of additional generators to be used. Methods and systems which reduce the number of components in the electrical power system while stabilizing the rate of average power demand within the system are desirable.

SUMMARY

In one implementation, a computer-implemented method for stabilizing power rate of change in an electrical power system using an electrical energy storage unit, is disclosed.

In another implementation, an electrical power system for stabilizing power in an electrical power system using an electrical energy storage unit, is disclosed.

In yet a further implementation, a computer readable medium having instructions therein, the instructions being executable by a processor to cause the processor to perform operations for stabilizing power rate of change in an electrical power system using an electrical energy storage unit, is disclosed.

DETAILED DESCRIPTION

The present disclosure relates to a supplemental electrical power system for generator applications. The supplemental electrical power system allows the generators that supply power to be sized based according to average power load of the system rather than the peak load of the system. An electrical energy storage unit system provides a stable power source to the electrical power system, which allows an electrical energy storage unit control system to respond quicker than the generators.

Figure 1:
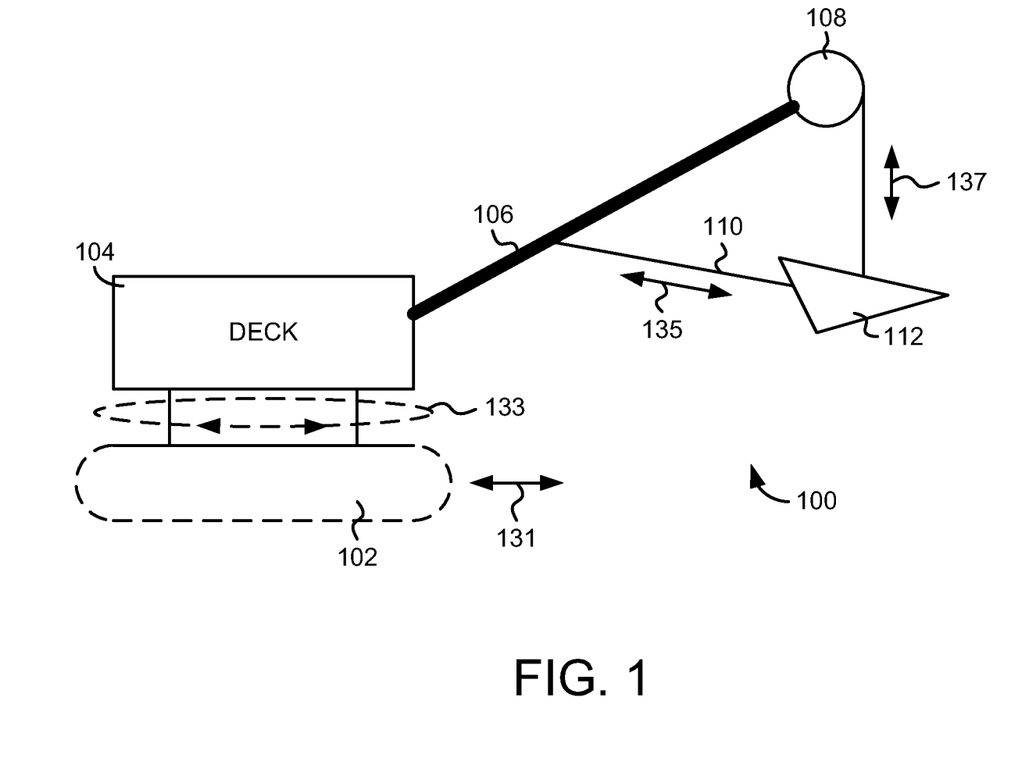
FIG. 1 illustrates a general schematic of an electric shovel.

Mining excavators may include electric shovels and draglines. FIG. 1 illustrates a general schematic of an electric shovel 100 to show a mining excavator that consumes significant electrical power. The major components may include crawler 102, deck 104, boom 106, hoist 108, handle 110, and dipper 112. Electric motors may enable various motions to operate electrical shovel 100. Motion 131 propel (forward/reverse directions) may refer to travel of the entire electric shovel 100 with respect to the ground. Motion 133 swing (away/return directions) refers to rotation of deck 104 with respect to crawler 102. Motion 135 crowd (crowd/retract directions) refers to positioning of dipper 112 with respect to boom 106. Motion 137 hoist (hoist/lower directions) refers to positioning dipper 112 up and down with respect to the ground. In some implementations, multiple electric motors may be used to provide each motion.

The electric shovel 100 typically performs a series of repetitive operations. For example, it may propel forward near a bank, swing the dipper 112 into position, crowd the dipper 112 into the bank, hoist the dipper 112 to scoop out material, retract the dipper 112, propel in reverse to clear the bank, propel forward to a dump site, swing the dipper 112 into position, lower the dipper 112, and dump the load. It then returns to the bank and repeats the operations. Motors may, then, often accelerate in one direction, brake, and accelerate in the opposite direction. The mechanical load on a motor may be highly variable. For example, a motor hoisting the dipper 112 full of heavy material, dumping the material, and lowering an empty bucket may use a variety of different mechanical loads.

From one electrical power perspective, the electric shovel 100 presents a cyclic load to an electrical power source. As a function of operating time, the electrical power drawn by the electric shovel 100 varies cyclically. The variation in the power may be significant, e.g., the average power drawn by these machines may be about 55% of their peak power demand. From another electrical power perspective, the electrical shovel 100 may draw power from a generator power source. At some instances and/or during some operations, such as hoisting the dipper 112 full of heavy material, the electric shovel 100 may require more instantaneous power than what the generator can supply.

Under normal operation, an electric motor converts electrical energy into mechanical energy. An electric motor may also be operated in reverse as a generator to convert mechanical energy to electrical energy. Under normal operation, an electric motor draws (consumes) electrical power from an electrical power source. When an electric motor under motion is stopped, the residual mechanical energy may be converted to electrical energy. Herein, a time interval during which an electrical load is drawing electrical energy is referred to as a motoring interval; and a time interval during which an electrical load is generating electrical energy is referred to herein as a regeneration interval.

Figure 2:
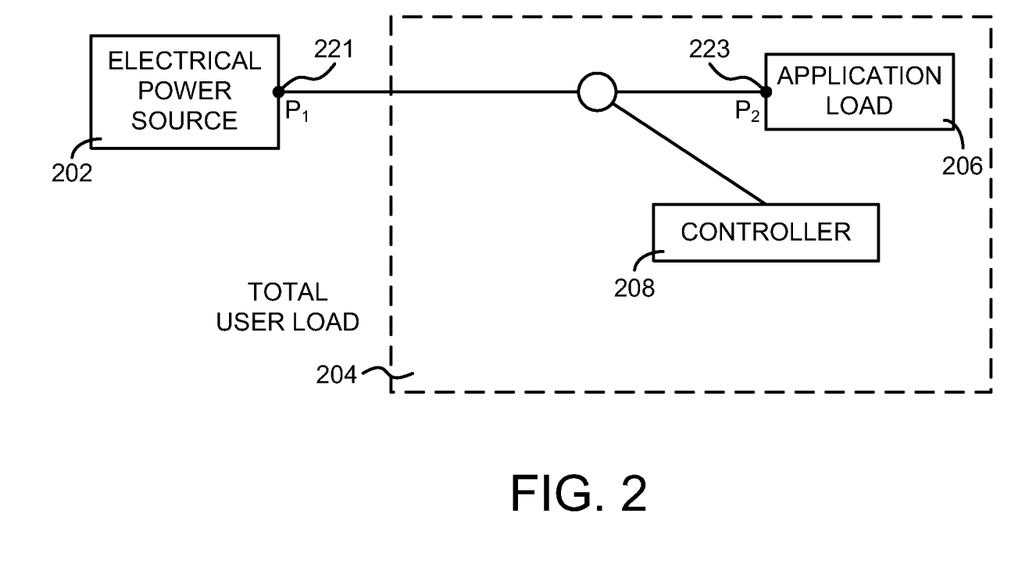
FIG. 2 illustrates an overview of a cyclic load drawing electrical power from an electrical power source.

In FIG. 2, an overview of a cyclic load drawing electrical power from an electrical power source is shown. Electrical power source 202 (e.g., a generator) may feed total user load 204. In this example, total user load 204 may include application load 206. Application load 206 may include the load of the motor driving the machinery, while the total user load 204 may include the load of all of the machinery within the electrical power system. Controller 208 may control the electrical power transferred between electrical power source 202 and application load 206. Electrical power P1 221 represents the output electrical power from electrical power source 202.

Electrical power P2 223 represents the input electrical power drawn by application load 206, which, in this example, is a cyclic load. The input electrical power required to operate a load is referred to as the electrical power demand of the load.

Figure 3:
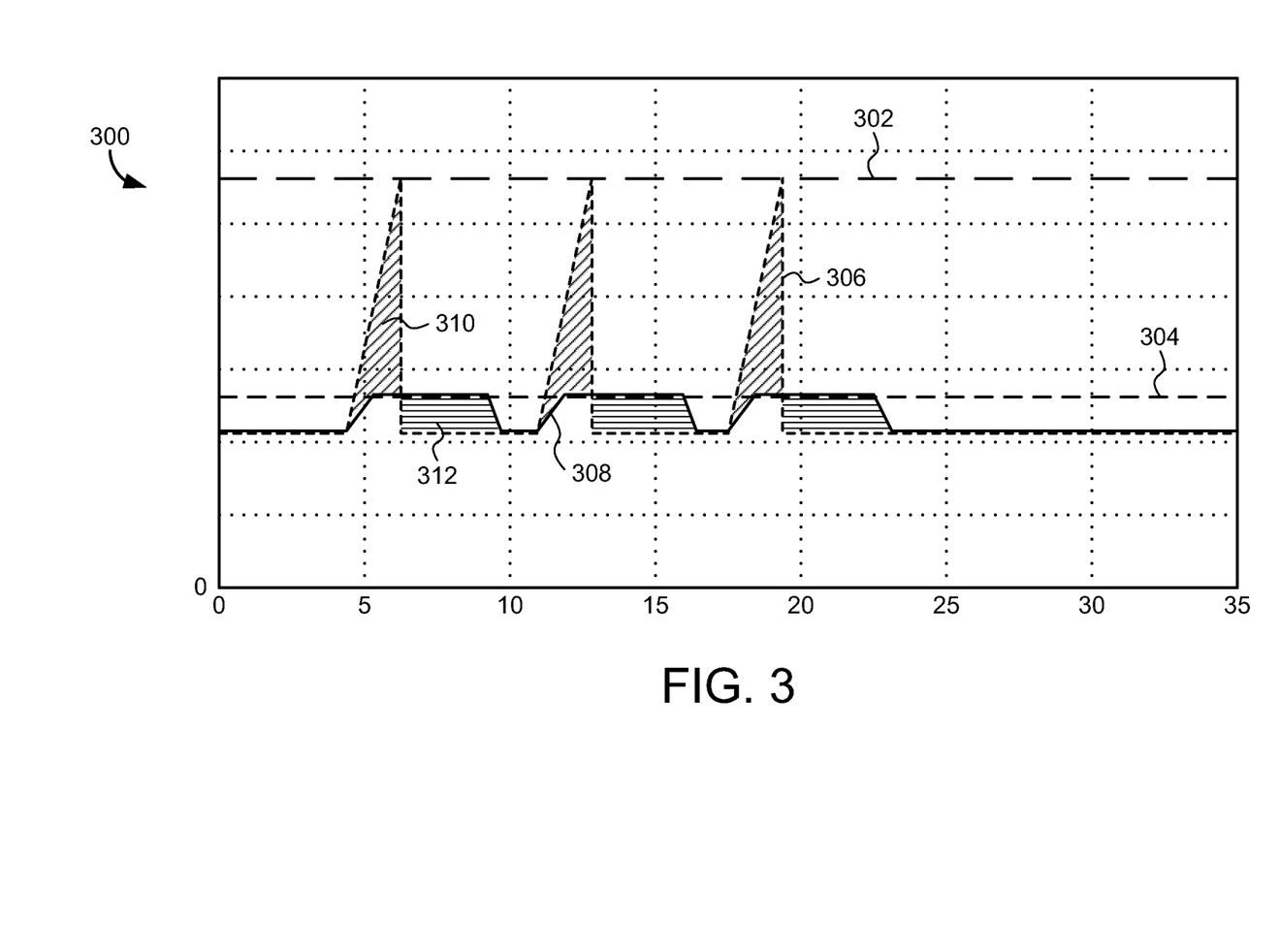
FIG. 3 illustrates an application where a generator is providing power to a system with instantaneous demands.

FIG. 3 illustrates an application where a generator is providing power to a system with instantaneous demands. Power curve 300 is illustrated as follows: Generator-rated power required without electrical energy storage unit control system 302, generator-rated power required with electrical energy storage unit control system 304, system demand 306, generator supply 308, electrical energy storage unit control system discharging (310; indicated with diagonal lines), and electrical energy storage unit control system charging (312; indicated with horizontal lines).

As the high instantaneous power demand is made (illustrated as a rapid spike in system demand 306), the electrical energy storage unit control system 610 provides power stored in an electrical energy storage unit(s) 510 to the system to supplement the capacity of the generator(s), at 310. Without the electrical energy storage unit control system 610, a high rated power, illustrated as 302, is required of the generator(s). With the electrical energy storage unit control system 610, generators having a lower rated power, illustrated as 304, may be utilized. As the power demand 306 of the system decreases, the electrical power system begins to recharge the electrical energy storage unit(s) 510 at 312. The generators continue to supply 308 electrical energy to the system beyond demand 306, with the excess energy charging the energy storage unit(s) 510. After a particular amount of charging time (e.g., once the electrical energy storage unit(s) 510 is near the full charge), then the electrical energy storage unit control system 610 signals the generator to reduce the power output to the electrical energy storage unit(s) 510.

Figure 4:
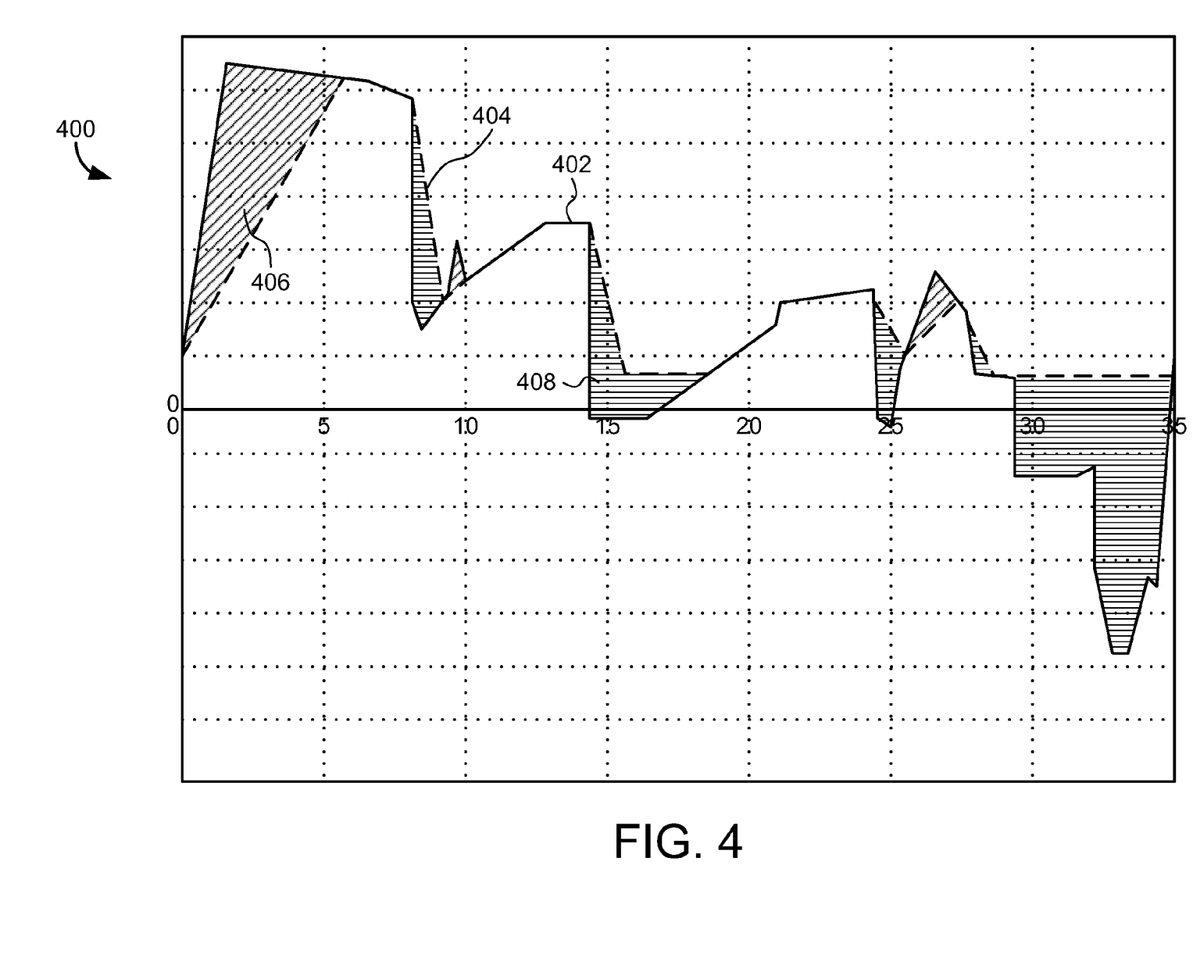
FIG. 4 illustrates a cyclical power curve with regeneration.

FIG. 4 illustrates a cyclical power curve with regeneration. Power curve 400 is illustrated as follows: shovel demand 402, generator supply 404, electrical energy storage unit control system discharging (406; illustrated with diagonal lines), and electrical energy storage unit control system recharging (408; illustrated with horizontal lines). As described in further detail below, power curve 400 may represent a single cycle in which a mining shovel picks up a load of material, pulls back, rotates, drops the material into a vehicle to remove the material from the area, rotates back towards the mining area, and stops.

Figure 5:
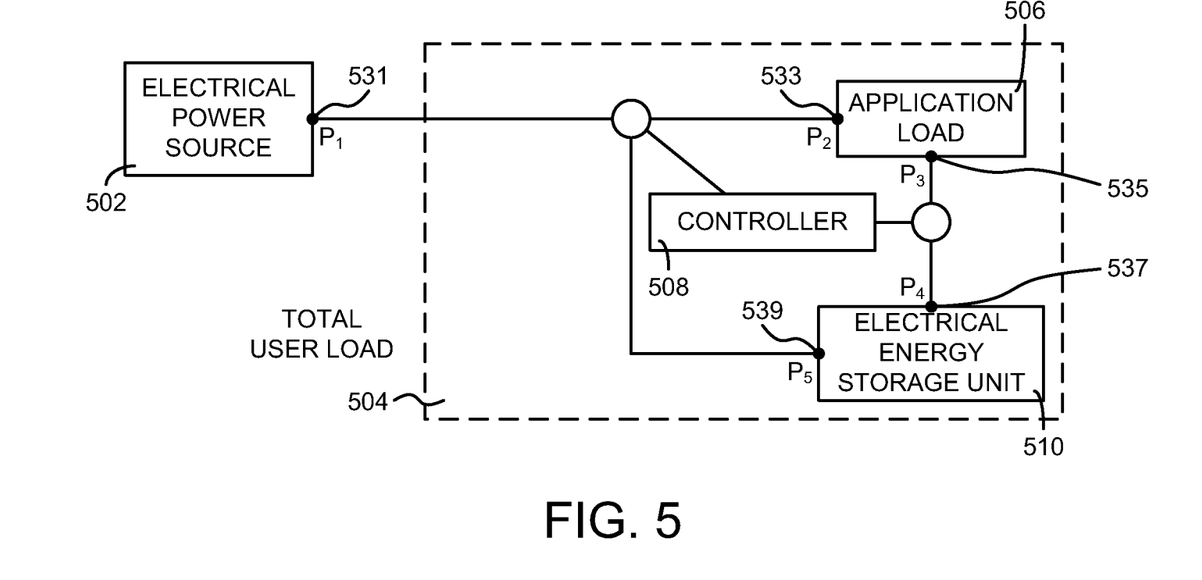
FIG. 5 illustrates an overview of a cyclic load drawing electrical power from an electrical power source and an electrical energy storage unit.
Figure 6:
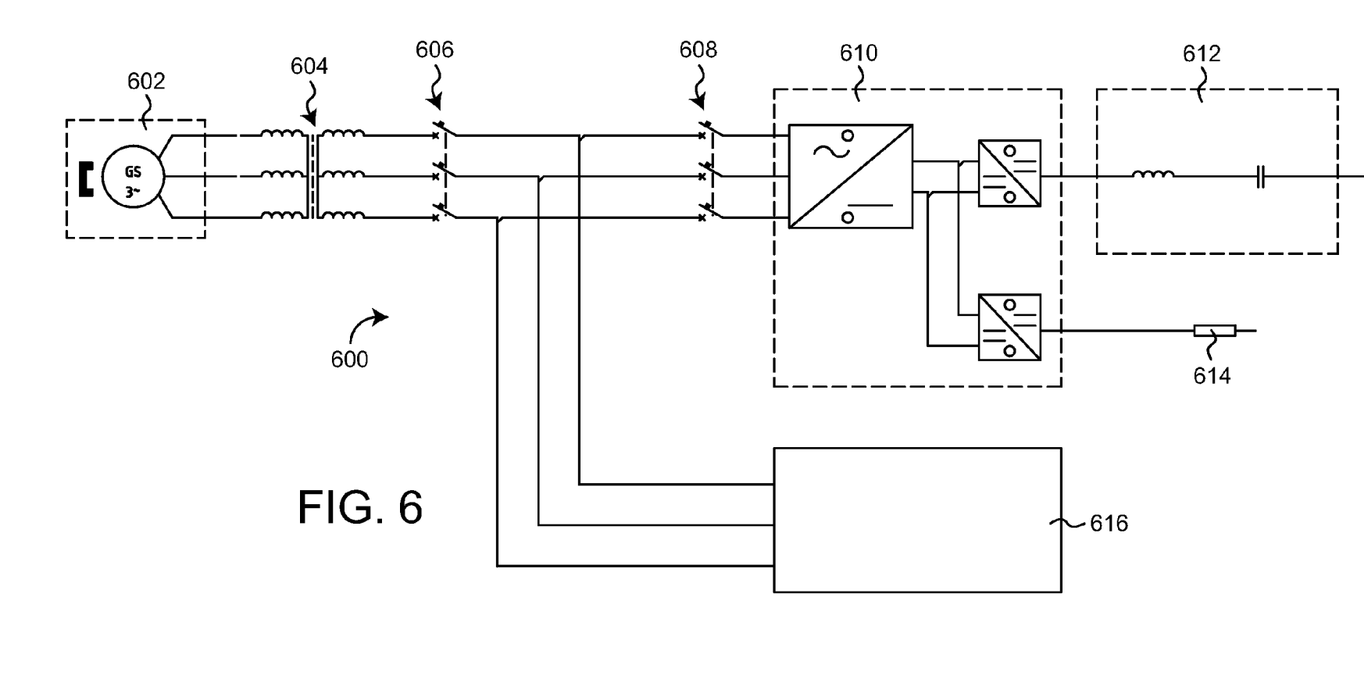
FIG. 6 illustrates a schematic of the electrical power system with the integrated electrical energy storage unit control system.

Regeneration is shown in FIG. 4, e.g., the electrical shovel 100 may consume power, but will also have the ability to generate power and reapply that power to the electrical power system. In a brief overview, during times of decreased demand, an electrical energy storage unit control system 610 (as illustrated in FIG. 6) may store electrical energy in electrical energy storage units 510 (as illustrated in FIG. 5). When demand increases, the stored energy may be used to supplement the energy provided by the generator(s) to meet the increased demand.

If the electrical energy storage unit(s) 510 becomes fully charged, while the electric shovel 100 is using power from the generator, then the electrical energy storage unit control system 610 may redirect the power to a resistor(s) 614 (as illustrated in FIG. 6). The resistor(s) 614 is used to dissipate some of the excess energy in the system as thermal energy, or heat. The electrical energy storage unit control system 610 ensures that the electrical energy storage unit(s) 510 can efficiently absorb power and effectively apply the power within the system. In some implementations, the electrical energy storage unit control system 610 may direct power to the resistor(s) 614 only when necessary to ensure a stabilized system.

The instantaneous demands of the system can be met by using a generator capacity based upon peak power demand. The electrical energy storage unit control system 610 reduces the generator capacity and/or the amount of generators needed to stabilize/meet power demand, which lowers cost, noise and heat of the electrical power system.

As illustrated in FIG. 4, at 0 seconds, a dig cycle for the electrical shovel 100 begins. For example, the electric shovel 100 may be about to engage a bank to recover material. The generator may be idle at 0 seconds. In the illustrated embodiment, the generator 404 ramps up to meet the demand of the shovel 402 but does not have the capacity to meet the power demand as quickly as is required. To achieve the demanded power output while using a generator having a smaller capacity, the electrical energy storage unit control system 610 signals the electrical energy storage unit(s) 510 to discharge 406 and supplement the power supplied by the generator to meet the power demand of the machine. The electrical energy storage unit(s) 510 continue to supplement the power supplied by the generator until the generator output power level reaches the level of demand at approximately 5-6 seconds.

At 7-8 seconds, the electric shovel 100 disengages from the bank, pulls back, or performs another operation causing a decrease in the power demanded by the load. As the shovel demand 402 decreases, the generator power output 404 slowly ramps down. The generator power output ramps down more slowly than the sharp decrease in demand, generating more power than is needed by the shovel. The excess power is used to recharge the electrical energy storage unit(s) 510.

Between 8-14 seconds, the power demand 402 of the load increases gradually. The electric shovel 100 may be swinging the bucket to the position of a repository such as a truck that removes the material from the area and/or hoisting the dipper 112 up to a height to empty the material into the truck. During this time period, the generator supply 404 generally tracks the power demand 402, indicating that the generator is able to meet demand without supplemental power from the electrical energy storage unit(s) 510. During a small period of time around 9-10 seconds, demand momentarily spikes above a level that can be instantaneously met by the generator, and the electrical energy storage unit(s) 510 are discharged to provide the momentary power demand.

At 14 seconds, regeneration is shown in the form of the electrical energy storage unit control system recharging 408. The electric shovel 100 has stopped swinging and may be dipping the bucket to empty the material into a truck. At this moment (e.g., from approximately 14 seconds to 17 seconds), the motor of the shovel begins regenerating energy back into the electrical system (e.g., converting kenetic energy into electrical energy) as illustrated by the shovel demand 402 below zero. The energy regenerated into the electrical system is used to recharge the electrical energy storage unit(s) 510. Additionally, during the time period starting at 14 seconds, the generator begins to reduce power output as a result of the decreased demand until is reaches an idle level. From 14 seconds until approximately 18 seconds, the generator supply 404 remains greater than the demand, and the excess energy is also used to recharge electrical energy storage unit(s) 510. In some embodiments, if the energy regenerated by the load and the excess energy generated by the generator cause the charge level of the electrical energy storage unit(s) 510 to exceed a maximum charge level, the excess energy may be dissipated using a resistor(s) 614.

From 18 to 20 seconds, the dipper 112 may be lowered back to the ground in preparation for retrieving another bucket full of material or perform another operation associated with an increase in shovel demand 402. Again, the generator is able to meet the power demand of the load and no supplemental energy is required from the electrical energy storage unit(s) 510.

At 24 seconds, the lowering motion of the dipper 112 is stopped, meaning the shovel demand 402 decreases, and the shovel motor momentarily generates energy into the electrical system. The regenerated energy and the excess energy generated by the generator are used to recharge the electrical energy storage unit(s) 510. At 25 seconds, another sharp instantaneous spike in demand 402 from the load is received that cannot be fully met by the generator supply 404. The electrical energy storage unit(s) 510 is discharged to supplement the generator supply 404 until the generator is able to ramp up and meet the demand.

From 30-35 seconds, the electrical shovel 100 is slowed to a stop, causing the motor to regenerate a substantial amount of power into the electrical system. This regenerated power, as well as any excess power generated by the generator, are again used to recharge the electrical energy storage unit(s) 510.

Referring to FIG. 5, an overview of a cyclic load drawings electrical power from an electrical power source and an electrical energy storage unit is illustrated. Electrical power source 502 feeds total user load 504. In this example, total user load 504 may include application load 506 and electrical energy storage unit 510. Controller 508 controls the electrical power transferred between electrical power source 502 and electrical energy storage unit 510, and between application load 506 and electrical energy storage unit 510.

Electrical power P1 531 represents the output electrical power from electrical power source 502. Electrical power P2 533 represents the input electrical power drawn by application load 506, which, in this example, is a cyclic load. Electrical power P3 535 represents the electrical power generated by application load 506 in the regeneration region. Electrical power P4 537 represent the electrical power received by electrical energy storage unit 510 from application load 506. Electrical power P5 539 represents the output electrical power from electrical energy storage unit 510.

An example of electrical energy storage unit 510 may include a capacitor. The capacitor may include an ultracapacitor that is capable of high energy or power density. Multiple capacitors may be connected in series and/or parallel. Current flowing into the capacitor charges the capacitor and electrical energy is stored via charge separation at the interface. The stored electrical energy may then later be used to output an electrical current. Electrical power P3 535 may, for example, be generated by application load 506 and then fed as electrical power P4 537 to charge electrical energy storage unit 510. In addition, electrical power P1 531 output by electrical power source 502 may be fed as electrical power P5 539 to charge electrical energy storage unit 510.

Referring to FIG. 6, a schematic 600 of the electrical power system with the integrated electrical energy storage unit control system is illustrated. The electrical power system is represented by generator 602 as the power source, transformer array 604, field switch 606 and switch gear 608, electrical energy storage unit control system 610, capacitor system 612, resistor(s) 614, and load equipment 616. Generator 602 supplies power to a cyclic load. In some implementations, generator 602 may be assisted by electrical energy storage unit control system or regenerate energy from the load. Field switch 606 may be located off-board from the electrical machinery. Switch gear 608 may be located on-board the electrical machinery. Field switch 606 and switch gear 608 may perform difference functions for the electrical machinery.

Electrical energy storage unit control system 610 may include an active front end to put power back online as well as controls within drive units to either route power to the capacitor system 612 or resistor(s) 614. Capacitor system 612 may include electrical components, such as inductors and capacitors. Electrical energy storage unit control system 610 may be disconnected from the electrical power system via switch gear 608. Electrical energy storage unit control system 610 may be managed by a controller.

Figure 7:
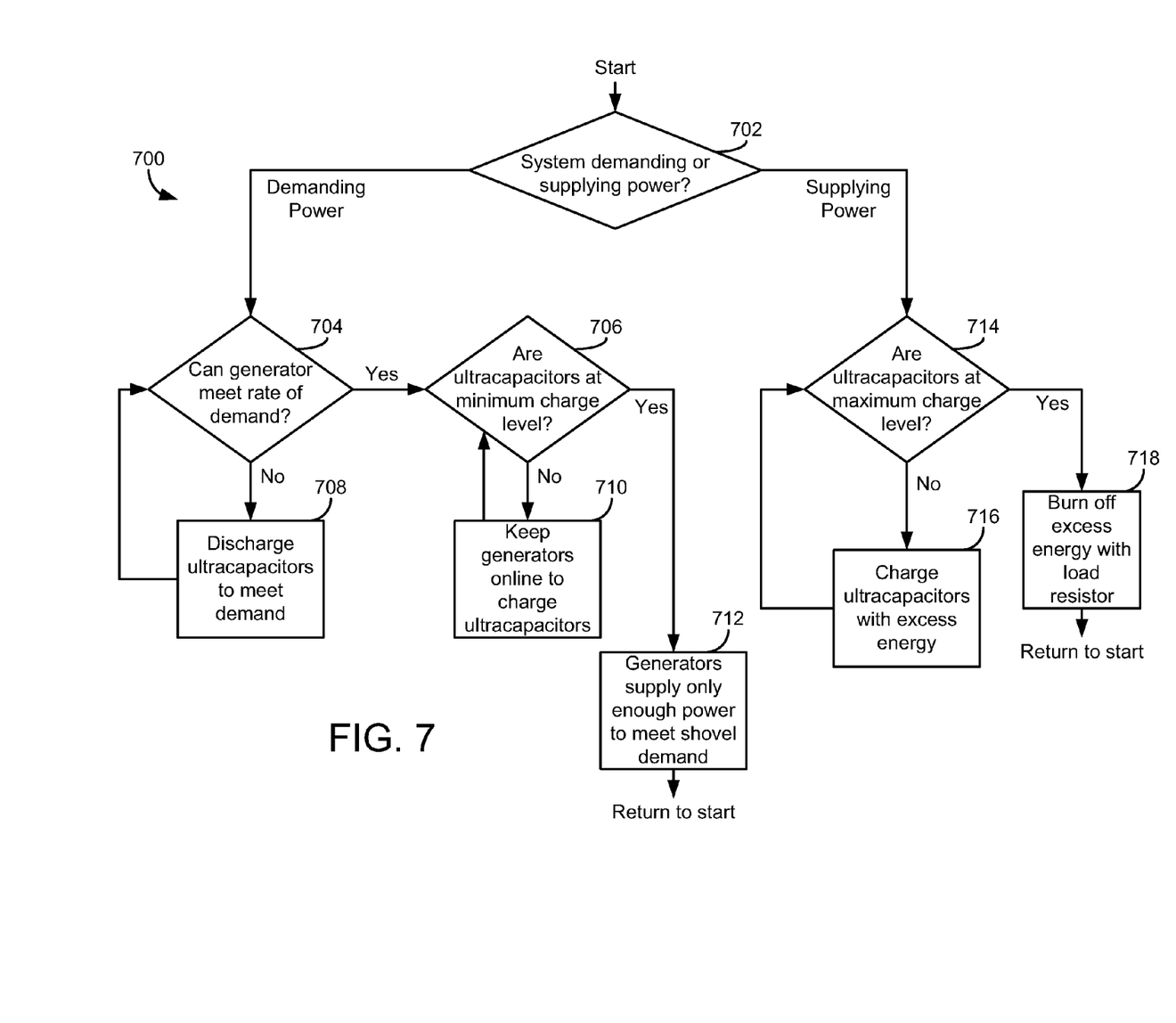
FIG. 7 illustrates a flow chart of steps for stabilizing power rate of change in an electrical power system.

In FIG. 7, a flow chart of steps for stabilizing power rate of change within an electrical power system is illustrated. At 702, a determination is made as to whether the electrical power system, e.g., of the electrical machinery, such as the shovel 100 shown in FIG. 1, is supplying or demanding power. The electrical power system may include a generator, electrical energy storage unit and a load. When the load is consuming power, then the electrical machinery and control logic may be in motoring mode. When the load is regenerating power, then the electrical machinery and control logic may be in generating mode.

If the load is supplying power, such as in regeneration, then a determination, at 714, may be made as to whether the electrical energy storage unit(s) is at the maximum charge level. If the electrical energy storage unit(s) are above their desired state of charge, as determined by the system, then the excess power is directed to a resistor(s) at 718 and the process passes to 702. If the electrical energy storage unit(s) is below its desired state of charge, then the electrical energy storage unit(s) is charged with power at 716.

If the load is demanding power, then a determination is made as to whether the generator can meet the power demand at 704. If the generator cannot meet the power demand, then the electrical energy storage unit may be discharged to supplement the power from the generator to help meet the power demand at 708.

If the generator can meet the power demand, then a determination is made, at 706, whether the electrical energy storage unit(s) is at its desired state of charge. If not, then the generator is kept online to charge the electrical energy storage unit(s) at 710. Once the electrical energy storage unit(s) are charged to the desired level, then the generator supplies all the requisite amount of power to meet the demand of the machinery, at 712. The process then returns to 702. The desired level of charge may include a range of values that is determined by the system and/or the type of electrical energy storage unit(s) used. In a non-limiting example, the desired state of charge for a minimum charge may be a target of 30% while the desired state of change for a maximum charge may be a target of 90%.

Figure 8:
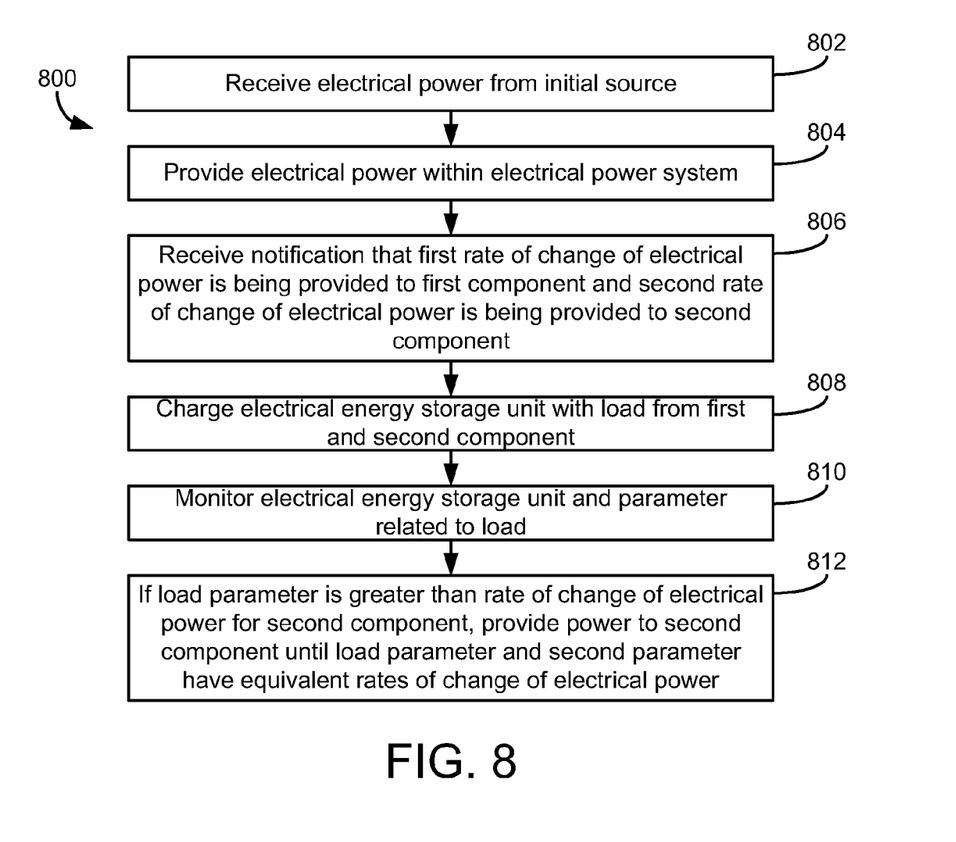
FIG. 8 illustrates a flow diagram of a method for stabilizing power rate of change in an electrical power system using an electrical energy storage unit.

In FIG. 8, a flow diagram of a method for stabilizing power rate of change in an electrical power system using an electrical energy storage unit is shown. Method 800 is provided by way of example, as there are a number of ways to carry out the methods according to the present disclosure. Method 800 shown in FIG. 8 may be executed or otherwise performed by one of a combination of various systems. For example, method 800 may be implemented by a computer, a computer program product, a computer program, a server, a client-server relationship, etc. Method 800 is described herein as carried out by schematic 600 of FIG. 6, by way of example.

The example method 800 may begin at block 802, where electrical power is received from an initial source. The initial source can be a battery, a generator, or any other appropriate power source.

At block 804, electrical power is provided within the electrical power system. For example, electrical power may be provided to/from the generator to the electrical machinery. In some implementations, the electrical energy storage unit system may be integrated into the first component of the electrical power system, such as the electrical machinery.

At block 806, a notification is received that the first rate of change of electrical power is being provided to a first component of the electrical power system and a second rate of change of electrical power is being provided to a second component of the electrical power system.

For example, the first component of the electrical power system may include a device configured to operate using a generator. The device may include an electric rope shovel, a long wall miner, an electric power drill, etc. In some implementations, the device includes a mining excavator as shown in FIG. 1. The mining excavator may include an electric shovel, a dragline, etc. The second component of the electrical power system may include a generator, a generator application, at least two generators, etc.

At block 808, an electrical energy storage unit is charged with a load from the first and the second component of the electrical power system. For example, the electrical energy storage unit may include a capacitor. The capacitor may be charged with a load from the electrical machinery or from the generator during a non-peak power demand period.

At block 810, the electrical energy storage unit and a parameter related to the load are monitored. For example, an electrical energy storage unit control system may monitor the electrical energy storage unit and the load requirements.

At block 812, based on the monitoring, if the load parameter is greater than the second rate of change of electrical power for the second component of the electrical power system, providing power from the electrical energy storage unit to the second component until the load parameter and the second component have equivalent rates of change of electrical power. For example, the electrical energy storage unit control system may control whether to provide supplemental power from the electrical energy storage unit.

In another example, if the electrical power system is operating with a regenerative load and the electrical energy storage unit is charged, then a resistor may absorb electrical power from the electrical power system. In other implementations, the resistor may absorb electrical power from the electrical power system if the rate regeneration exceeds the charging capacity of the electrical energy storage unit.

If the load parameter is less than or equal to the rate of change of power for the second component of the electrical power system, the electrical energy storage unit may be recharged.

INDUSTRIAL APPLICABILITY

Methods and systems described herein allow the generator(s) that supply power to be sized accordingly to the average load of the electrical power system instead of the peak load of the system. The smaller number of generators lowers the initial purchase and/or rental cost to effectively operate the electrical machinery, such as the mining excavator. The electrical energy storage unit control system provides a more stable power source since the control system can respond more quickly than a generator to stabilize the power within the electrical power system. The integration of the electrical energy storage unit system into the machinery provides high speed supplemental power that reduces the instantaneous demand on the generator(s).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure may contemplate methods, systems and program products on any machine-readable storage media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can comprise RAM, ROM, EPROM, EEPROM, CD-ROM or other optical disk storage, magnetic disk storage or other magnetic storage devices, flash memory, or any other medium which can be used to carry or store desired program code in the form of machine-executable instructions or data structures and which can be accessed by a general purpose or special purpose computer or other machine with a processor. Machine-readable storage media are tangible storage media and are non-transitory (i.e., are not merely signals in space). Combinations of the above are also included within the scope of machine-readable storage media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A method for stabilizing power rate of change in an electrical power system using an electrical energy storage unit, the method comprising:
   receiving electrical power from an initial source;
   providing electrical power within the electrical power system;
   receiving a notification that a first rate of change of electrical power is being provided to a first component of the electrical power system and a second rate of change of electrical power is being provided to a second component of the electrical power system;
   charging the electrical energy storage unit with a load from the first and second component of the electrical power system;
   monitoring the electrical energy storage unit and a parameter related to the load; and
   based on the monitoring, if the load parameter is greater than the second rate of change of electrical power for the second component of the electrical power system, providing power from the electrical energy storage unit to the second component until the load parameter and the second component have equivalent rates of change of electrical power.

2. The method of claim 1, wherein the first component of the electrical power system comprises a device configured to operate using a generator.

3. The method of claim 2, wherein the device comprises at least one of an electric rope shovel, a long wall miner, and an electric power drill.

4. The method of claim 2, wherein the device comprises a mining excavator.

5. The method of claim 3, wherein the mining excavator comprises at least one of an electric shovel; and a dragline.

6. The method of claim 1, wherein the second component of the electrical power system comprises a generator.

7. The method of claim 1, further comprising:
   if the electrical power system is operating with a regenerative load and the electrical energy storage unit is charged, absorbing, by a resistor, electrical power from the electrical power system.

8. The method of claim 1, further comprising:
   if the load parameter is less than or equal to the rate of change of power for the second component of the electrical power system, recharging the electrical energy storage unit.

9. The method of claim 1, wherein the monitoring of the electrical energy storage unit and the load parameter is performed by a electrical energy storage unit control system.

10. The method of claim 9, wherein the electrical energy storage unit control system is integrated into the first component of the electrical power system.

11. The method of claim 1, wherein the electrical energy storage unit comprises at least one electrical energy storage unit.

12. An electrical power system for stabilizing power in an electrical power system using an electrical energy storage unit, the electrical power system comprising:
    a first component;
    a second component;
    an electrical energy storage unit; and
    a processor configured to:
       receive electrical power from an initial source;
       provide electrical power within the electrical power system;
       receive a notification that a first rate of change of electrical power is being provided to a first component of the electrical power system and a second rate of change of electrical power is being provided to a second component of the electrical power system;
       charge the electrical energy storage unit with a load from the first and second component of the electrical power system;
       monitor the electrical energy storage unit and a parameter related to the load; and
       based on the monitoring, if the load parameter is greater than the second rate of change of electrical power for the second component of the electrical power system, provide power from the electrical energy storage unit to the second component until the load parameter and the second component have equivalent rates of change of electrical power.

13. The system of claim 12, wherein the first component of the electrical power system comprises a device configured to operate using a generator.

14. The system of claim 12, wherein the device comprises at least one of an electric rope shovel, a long wall miner, and an electric power drill.

15. The system of claim 12, wherein the second component of the electrical power system comprises a generator.

16. The system of claim 12, wherein the electrical energy storage unit comprises a electrical energy storage unit.

17. A non-transitory computer-readable medium having instructions therein, the instructions being executable by a processor to cause the processor to perform operations stabilizing power rate of change in an electrical power system using an electrical energy storage unit, the operations comprising:
    receiving electrical power from an initial source;
    providing electrical power within the electrical power system;
    receiving a notification that a first rate of change of electrical power is being provided to a first component of the electrical power system and a second rate of change of electrical power is being provided to a second component of the electrical power system;

charging the electrical energy storage unit with a load from the first and second component of the electrical power system;

monitoring the electrical energy storage unit and a parameter related to the load; and based on the monitoring, if the load parameter is greater than the second rate of change of electrical power for the second component of the electrical power system, providing power from the electrical energy storage unit to the second component until the load parameter and the second component have equivalent rates of change of electrical power.

18. The non-transitory computer-readable medium of claim 17, the operations further comprising:

if the electrical power system is operating with a regenerative load and the electrical energy storage unit is charged, absorbing, by a resistor, electrical power from the electrical power system.

19. The non-transitory computer-readable medium of claim 17, the operations further comprising:

if the load parameter is less than or equal to the rate of change of power for the second component of the electrical power system, recharging the electrical energy storage unit.

20. The non-transitory computer-readable medium of claim 17, wherein the monitoring of the electrical energy storage unit and the load parameter is performed by a electrical energy storage unit control system.

* * * * *